United States Patent Office 3,705,792
Patented Dec. 12, 1972

3,705,792
LIQUID FLOW PROPORTIONING SYSTEM FOR METERING INTO A GLASS BATCH
Homer D. F. Peters, Sylvania, Ohio, assignor to Owens-Illinois, Inc.
Filed June 14, 1971, Ser. No. 152,545
Int. Cl. C03b *3/00*
U.S. Cl. 65—134
13 Claims

ABSTRACT OF THE DISCLOSURE

A liquid flow proportioning system, particularly useful for metering caustic soda into a glass batch, in which a flow control valve is held in a fixed position during periods of no flow to avoid transient effects upon the resumption of liquid flow. The control system also holds a set point feedback controller in a fixed operational mode during periods of no flow and additionally includes a system leak detector, a failure of flow alarm and a full flow alarm.

BACKGROUND OF THE INVENTION

(1) Field of the invention

This invention relates to apparatus for feeding batch materials into a glass melting furnace. More particularly, this invention relates to a batch feeding system wherein a liquid component is added to the dry components just prior to feeding the materials into the melting furnace. Still more particularly, the invention relates to a fluid proportioning system for the addition of the liquid component to the dry batch component. Yet more particularly, the invention is a transient insensitive feedback control system for liquid proportioning in glass batch feeding systems.

(2) Description of the prior art

The advantages of using a wet batch for melting in glass furnaces are well known, U.S. Pats. 3,081,180 and 3,149,983 are directed toward introduction of a liquid component to the commonly used dry batch material. U.S. Pat. 3,234,034 is particularly directed toward use of an aqueous solution of sodium hydroxide as a liquid component. Some of the advantages enumerated include less dust to be expelled from the furnace flue, a slower rate of erosion of the furnace regenerators due to decreased dusting and longer life for the furnace refractory lining, again due to a decrease in the dusting of the batch material.

The commercial use of wetted batch has been impeded by the tendency of wetted batch to cake and refusal to flow freely. In a co-pending United States application of Mills and Roll, Ser. No. 114,917, apparatus to overcome these problems is disclosed. However, the operation of the system has indicated that better control of the liquid addition than could be provided by the liquid proportioning systems of the prior art is desirable. One of the problems of any glass batch material feeding system is that the equipment is operated in an intermittent manner. That is, batch material is not fed continuously into a furnace, but is rather fed on demand from a furance level sensor. The present invention has been found to solve the problem of accurate, controlled addition of liquid, such as sodium hydroxide in an intermittent feeding process, to the wetted batch feeding and mixing apparatus disclosed by the Mills and Roll application, Ser. No. 114,917.

SUMMARY OF THE INVENTION

This invention relates to apparatus for feeding liquid and dry batch components into a glass melting furnace utilizing a transient flow insensitive fluid proportioning system for the controlled addition of the liquid component.

BRIEF DESCRIPTION OF THE DRAWINGS

FIG. 4 is a schematic circuit diagram of the leak detector device shown in FIG. 1.

DETAILED DESCRIPTION

Figure 1:
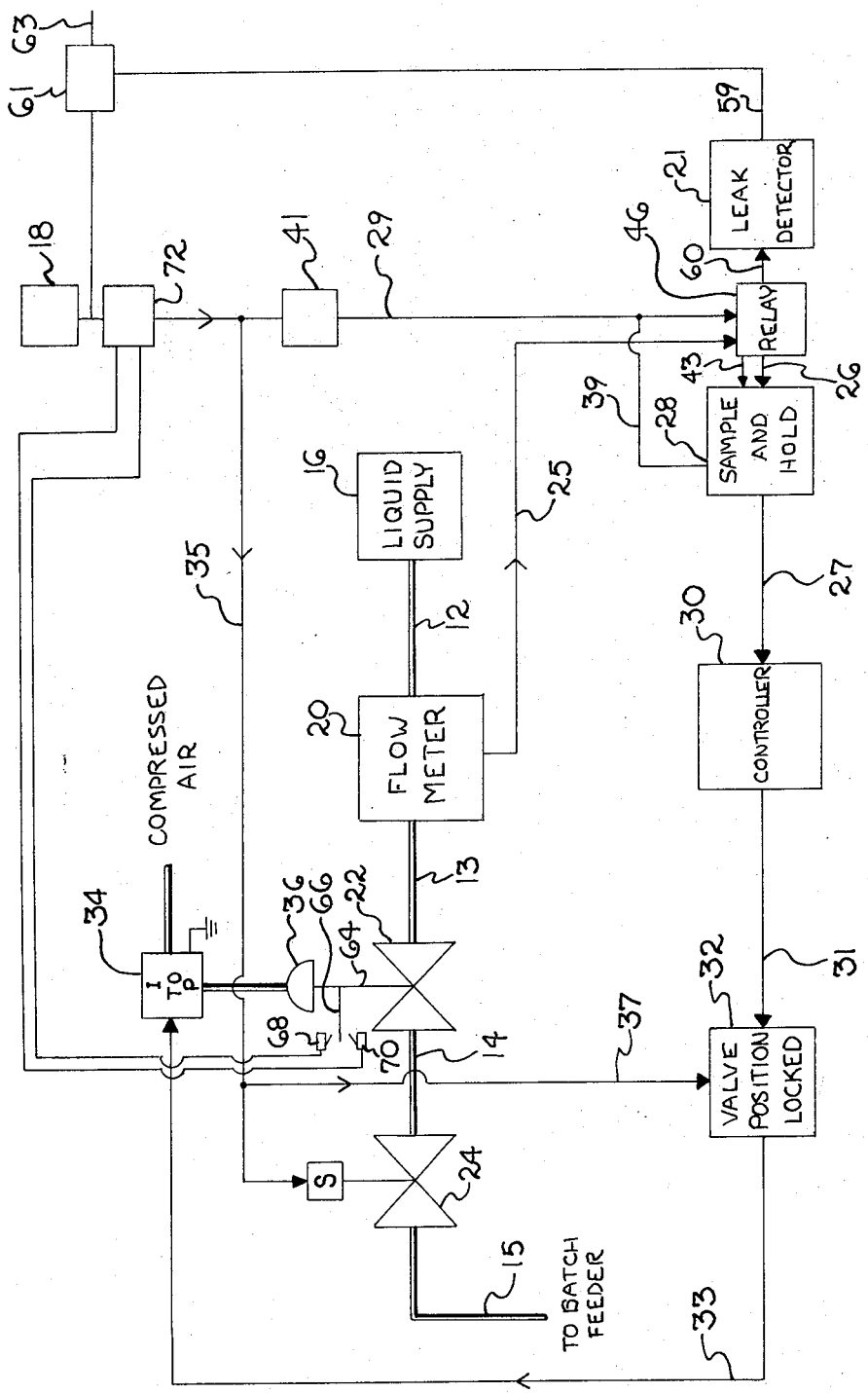
FIG. 1 is a diagrammatic illustration of the control system of the invention.

FIG. 1 is a diagrammatic illustration of the present invention. The elements are shown in block form to facilitate understanding of the operation, and various of the elements will be discussed in detail later. In this embodiment, the invention is shown as supplying a liquid to apparatus (not shown) for feeding wet and dry batch components into a glass melting furnace. This apparatus may be that shown in co-pending application of Mills and Roll, Ser. No. 114,917. The on and off control of the entire system is under the control of a glass furnace level controller 18 such as that disclosed in U.S. Pat. 2,645,749. The level controller 18 operates the batch feeding cycle and simultaneously operates the liquid system of the present invention to add a liquid component to the dry batch component. The liquid flows from a liquid supply 16 through a pipe 12 connected to a flow meter 20; a pipe 13 connects the flow meter 20 to a flow control valve 22. A solenoid valve 24 receives the flow of liquid from the control valve 22 through a pipe 14, the solenoid valve 24 passing the liquid into the glass batch feeding apparatus through a pipe 15.

Consider the situation when liquid is flowing through the pipes 12, 13, 14 and 15 and ultimately into the glass batch feeding apparatus. The flow meter 20, which is preferably a Brooks Magnetic Flowmeter manufactured by Brooks Instrument Div., Emerson Electric Co., Hatfield, Pa. 19440, produces an electrical signal proportional to the amount of liquid flowing and transmits the signal via suitable electrical wire means 25 to a relay 46 which transmits the signal through a wire 26 to a sample and hold circuit 28. The signal is passed by the sample and hold circuit 28 through a wire 27 to a controller 30. The controller 30, which is preferably a Dahl Model C601 Controller manufactured by G. W. Dahl Co., Bristol, R.I. 02809, may be set to maintain any desired flow rate, the flow rate being represented by an electrical current value. The controller 30 compares the signal from the flow meter 20 with a set point, and if there is any deviation, transmits an electrical signal through a wire 31 to a valve position locked circuit 32. The controller 30 normally transmits a signal corresponding to the set point value through a wire 33 from the position locked circuit 32 to an I to P or current to pressure converter 34, the correction signal being a value above or below the normal level. The flow control valve 22 may be adjusted by an air motor 36 to allow a greater or lesser quantity of liquid flow, thereby changing the amount of flow sensed by the flow meter 20. The I to P converter 34 changes the electrical signal from the controller 30 into an air pressure signal proportional to the electrical signal, which is used to operate the air motor 36. The flow control valve 22 is thus adjusted until the amount of liquid flowing through the flow meter 20 generates a signal which is equal to the set point of the controller 30. Since the I to P converter 34 no longer receives a correction signal, the flow control valve 22 will maintain the set point position for the desired flow rate.

When it is desired to stop the batch feeding operation, the level controller 18 will send an electrical signal to the solenoid valve 24 through a wire 35 causing the valve 24 to close and thereby stop the flow of liquid through the pipes 12, 13, 14 and 15. This signal will simultaneously stop the feeding of dry batch materials. In the flow control systems of the prior art, the flow control valve 22 would be set to a fully open position as the controller 30 attempted to maintain the set flow quantity even though liquid was no longer flowing. However, the valve position locked circuit 32 of the present invention prevents this from occurring.

Figure 2:
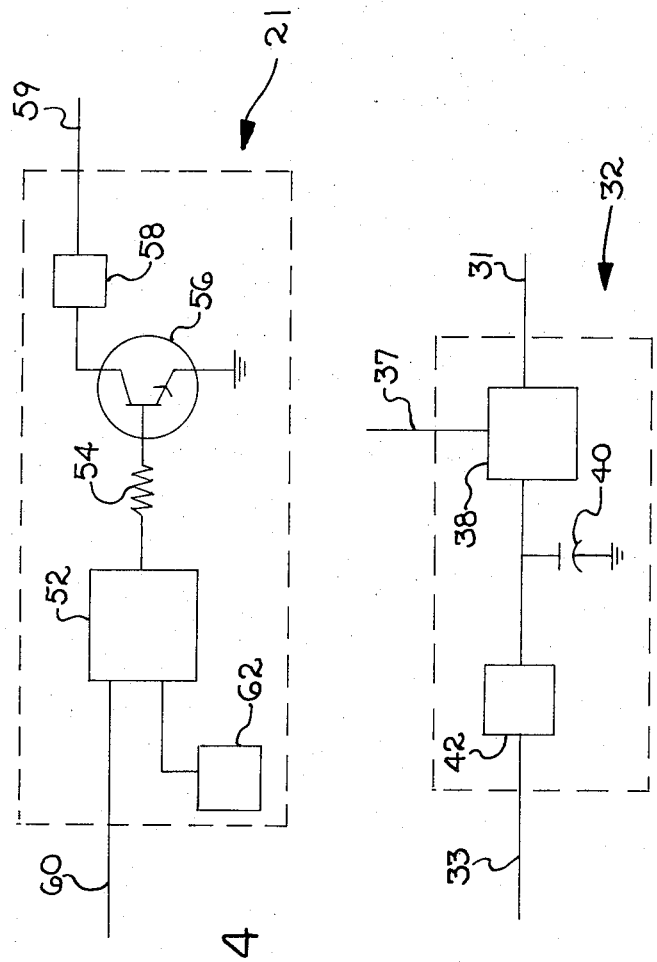
FIG. 2 is a schematic circuit diagram of the valve position locked circuit of FIG. 1.

FIG. 2 shows, in block diagram form, the valve position locked circuit 32. Under normal operating conditions, an integrating and holding capacitor 40 will furnish a current to the flow control valve 22 through a voltage to current converter 42 so that the flow control valve 22 will hold a particular position. When the solenoid valve 24 is closed, the same electrical signal from the level controller 18 through a wire 37 opens the contacts on a relay 38, thus isolating the controller 30 from the remainder of the control circuit. When the relay 38 opens, the integrating and holding capacitor 40 will have a particular charge value. The capacitor 40 will maintain a voltage at the input to the voltage to current converter 42 so long as the relay 38 is open, thereby keeping the flow control valve 22 in the position it held just prior to the closing of the solenoid valve 24.

It is also desirable to isolate the controller 30 from the effects of there being no flow through the flow meter 20. That is, the controller 30, having a no flow signal from the flow meter 20, would send a large error signal to the flow control valve 22. Although the flow control valve 22 is insensitive to such signals during periods of no flow due to the relay 38 being open, the controller 30 would transmit this large error signal to the flow control valve 22 as soon as the flow resumed if it were not for the sample and hold circuit 28.

Figure 3:
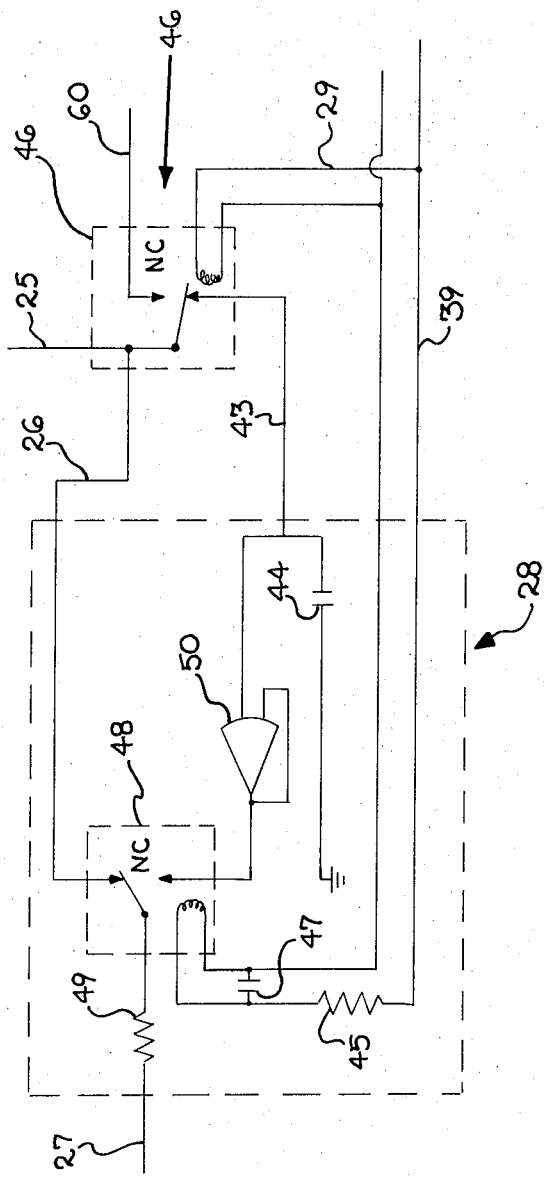
FIG. 3 is a schematic circuit diagram of the sample and hold device shown in FIG. 1.

As shown in FIG. 3, the sample and hold circuit 28 is a capacitor discharge circuit. During periods of flow, a capacitor 44 is charged, through a wire 43 and wire 25, to the value corresponding to the electrical output of the flow meter 20. The electrical signal from the level sensor 18, which turns off the solenoid valve 24, also switches the relay 46 through a multiple conductor wire 29 and a relay 48 through a multiple conductor wire 39 from the level sensor 18. The relay 46, when switched, disconnects the flow meter 20 from the capacitor 44, and connects the flow meter 20 to the leak detector circuit 21 through wire 60. Relay 48 disconnects the controller 30 from the flow meter 20 and connects the controller 30 to the sample and hold circuit 28. The capacitor 44, through an operational amplifier 50, furnishes a constant current signal to the controller 30 during periods of no flow. This holds the controller 30 at the error signal level it sensed just prior to the interruption of flow so that there will be no excessively large error signal to be fed to the flow control valve 22 upon the resumption of flow. A limiting resistor 49 is used to prevent excessively large voltage inputs to the controller 30 and the capacitor 44. To avoid having an excessively large voltage present across the capacitor 44, the relay 48 will switch slightly after the relay 46, upon cessation of flow. A resistor 45 and a capacitor 47 in the coil circuit of the relay 48 define an R-C circuit which provides a few milliseconds of delay between the switching of the relays 46 and 48.

The leak detector circuit 21 is shown in FIG. 4. It is desirable that there be no leakage of liquid when the solenoid valve 24 is closed. One possible reason for such a leak could be the failure of the solenoid valve 24 to close completely. The leak detector circuit 21 is connected to the flow meter 20 through the relay 46 by a wire 60 only during periods when the solenoid valve 24 is off. The leak detector circuit 21 is essentially a signal level detection circuit, designed to trip and give an alarm should the flow rate through the flow meter 20 exceed a pre-set value during periods of theoretical no flow.

As seen in FIG. 4, the leak detector circuit 21 is comprised of four major components: A voltage comparator 52, a resistor 54, a transistor 56 and a relay 58. The voltage comparator 52 is a circuit which compares a signal voltage, in this case furnished by the wire 60 from the relay 46, with a reference voltage, in this case furnished by a reference source 62, and gives one of two discrete outputs depending on whether the reference voltage is greater than the signal voltage or vice versa. The output from the comparator 52 flows through a current limiting resistor 54 to a transistor 56. So long as the voltage from the flow meter 20 is less than the reference voltage during periods of no flow, the comparator 52 will furnish voltage to the transistor 56 allowing it to be in the "on" or conducting state. The relay 58 is connected to a relay system 61, whose function will be explained later in detail, through an output wire 59. So long as the transistor 56 is "on," the relay 58 is energized and the system will operate. Should the signal from the flow meter 20 become greater than the reference signal, thus indicating a leak, the comparator will switch from one output to the other output, thereby turning off the transistor 56. This in turn de-energizes the relay 58, thereby stopping the entire operation and sounding an alarm as will be explained later. The comparator 52 is of the type shown as a "comparator with soft limit" on page 39 of the Handbook and Catalog of Operational Amplifiers, number L1–227, published by Burr-Brown Research Corporation, 1969.

With the system now in the off mode, it is necessary to explain the sequence of operations when it is desired to again allow liquid to flow. The solenoid valve 24 receives an electrical signal from level controller 18 from the wire 35 which causes it to open and allow liquid to resume flowing through pipes 12, 13, 14 and 15. As noted before, any signal to the solenoid valve 24 is also transmitted to the relays 38, 46, and 48 through wires 37, 29 and 39. Relay 38 is a time delay relay thus delaying the reconnection of the I to P converter 34 and the controller 30. In addition, the relays 46 and 48 are under the control of a time delay relay 41 which prevents the demand from the level controller 18 from activating the system at once upon the command for flow. This delay allows any transients due to the resumption of flow to die out. These transients are minor compared to those which would result if control was immediately reapplied to the system, but are of sufficient magnitude to require being dealt with. It should be noted that, since the valve position locked circuit 32 thus remains in control over the flow control valve 22, the initial flow of liquid will be at the rate at which it was flowing just prior to the interruption of flow. At this point, the leak detector circuit 21 is still connected to the flow meter 20 and would thus indicate a large leak upon the resumption of flow and shut down the entire operation. However, the output wire 59 from the relay 58 is connected to the relay system 61. The relay system 61 is controlled by the level controller 18 such that it is inoperative whenever liquid is flowing. Thus, when the level controller 18 calls for liquid, the relay system 61 is disabled and the shut down signal from the leak detector circuit 21 is not passed. The relay system 61 itself consists of a series of relays connected to as many components of the batch feeding system as desired through a multiple wire bundle 63. So long as the relay 58 is on, or the level controller 18 is on, the relay system 61 cannot pass a shut down signal to the various components. When a true leak occurs, the relay system 61 then operates to stop the entire operation and sound an alarm. Once the transients in the flow have subsided, normally a period of a few seconds, the relays 38, 46 and 48 are allowed to close. With the relay 38 closed, the flow control valve 22 is again under the control of the controller 30. With the relays 46 and 48 closed, the controller 30 receives signals from the flow meter 20, the sample and hold circuit 28 is disconnected from the controller 30, and the leak detector circuit 21 is disconnected from the flow meter 20. The error signal generated by the controller 30 will normally be quite small and the flow control valve 22 will thus require only minor adjustments.

If the sample and hold circuit 28 and the valve position locked circuit 32 were not provided, the flow control valve 22 would be fully open at the resumption of flow of liquid. This would result in a large flow through the flow meter 20 and a correspondingly large error signal from the controller 30. The net effect would be a period of wild oscillation as the controller 30 attempted to set the flow control valve 22 to a value which would correspond to the set point of the controller 30. The present invention eliminates this initial period of unstable operation.

Figure 5:
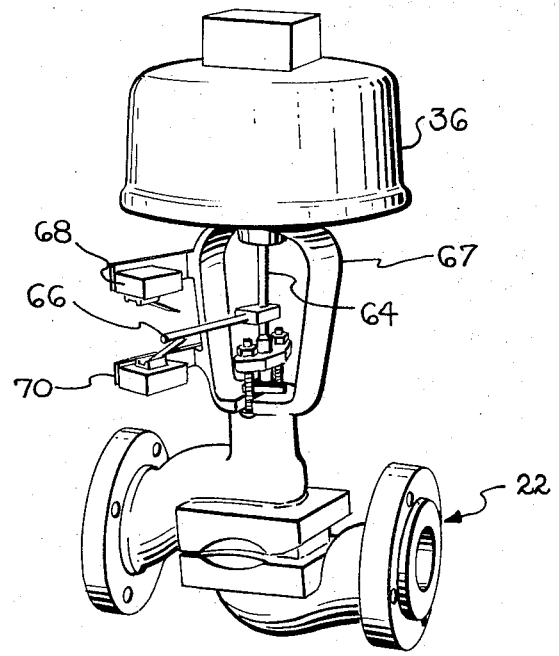
FIG. 5 is a perspective view of the flow control valve switches and air motor.

With the feedback control system of the invention in operation, it may be safely assumed that if the flow control valve 22 assumes the fully opened or fully closed position, a system malfunction has occurred. As best seen in FIG. 5, the air motor 36 is connected to the flow control valve 22 by a vertical shaft 64. Mounted on the shaft 64 is a horizontal arm 66. A bracket 67 supports the air motor 36 and helps guide the vertical shaft 64 as it is moved up and down. As the shaft 64 is moved upward, flow control valve 22 is opened further. An upper switch 68 is mounted on bracket 67 such that it will be closed by the arm 66 if the flow control valve 22 is fully opened. A lower switch 70 is mounted on the bracket 67 such that switch 70 will be turned on by arm 66 if the flow control valve 22 is fully closed. The switches 68 and 70 control a relay 72 which is normally closed. The signal from the furnace level controller 18 must pass through the relay 72. Thus, if either of the switches 68 or 70 are closed, the relay 72 opens, thus cutting off the signal from the level controller 18 and thereby shutting down the entire system as explained before in the case of a simple cessation of signal from the level controller 18. Of course, the signal from the switches 68 and 70 may be fed to other components of a total glass batch feeding system, which are not shown, to halt the operation of the entire process in the event of failure of the flow control valve 22.

In summary, the foregoing description has described a transient flow insensitive fluid proportioning feedback system. As an aid to complete understanding, the elements are now presented in a summary form. First, in sequence from downstream side to upstream side, three commercially available components are positioned: (1) a solenoid valve 24; (2) an air pressure controlled flow control valve 22 and (3) a fluid flow meter 20. The closed loop feedback control circuit is completed by the following additional items:

(1) An electrical current to air pressure converter 34 connected to the flow control valve;

(2) A control valve locking circuit 32 connected to the electrical current to air pressure converter;

(3) A set point controller 30 connected to the control valve locking circuit;

(4) A sample and hold circuit 28 connnected to the set point controller;

(5) A leak detection circuit 21 connected to the flow meter only during periods of no flow;

(6) The flow meter 20 is connected to the sample and hold circuit 28, through a relay 46, to complete the feedback loop.

I claim:

1. Apparatus for controlling the flow of a liquid componnt being intermittently added to and mixed with dry ingredients for feeding to a glass melting furnace comprising a liquid supply, a liquid feed line extending from said supply, on-off valve means in said line, furnace level sensing means connected to said on-off valve means for opening and closing said valve means, an adjustable flow metering valve located in said feed line between said on-off valve means and said liquid supply, means connected to said adjustable flow metering valve for adjusting said flow metering valve, a liquid flow meter in said line between said on-off valve means and said liquid supply, an electrical set point controller electrically connected to said flow meter and said means for adjusting said flow metering valve for maintaining a pre-set liquid flow rate, and means electrically connected in circuit between said set point controller and said means for adjusting said flow metering valve for maintaining said means for adjusting said flow metering valve, during periods of no liquid flow, in the operational position it held just prior to the interruption of liquid flow.

2. The apparatus of claim 1 further comprising means connected in circuit between said flow meter and said set point controller for maintaining said set point controller, during periods of no liquid flow, in the operational state it had assumed just prior to the interruption of the liquid flow.

3. The apparatus of claim 1, wherein said means to maintain said means for adjusting said flow metering valve in the operational position it held just prior to the interruption of the liquid flow includes a constant current capacitor discharge circuit, said capacitor discharge circuit being operable when said on-off valve is swtiched to the off position.

4. The apparatus of claim 2, wherein said means to maintain said set point controller in the operational state it had assumed just prior to the interruption of the liquid flow includes a constant current capacitor discharge circuit, said capacitor discharge circuit being operable when said on-off valve is switched to the off position.

5. The apparatus of claim 1 further comprising time delay relay means connecting said means for maintaining said means for adjusting said flow metering valve in the operational position it held just prior to the interruption of liquid flow with said set point controller for delaying, upon demand for flow from said furnace level sensing means, the re-engagement of said means for adjusting said flow metering valve with said set point controller.

6. The apparatus of claim 2 further comprising time delay relay means connecting said means for maintaining said set point controller in the operational state it had assumed just prior to the interruption of flow and said set point controller for delaying, upon demand for flow from said furnace level sensing means, the re-engagement of said flow meter and said set point controller.

7. The apparatus as defined in claim 1 further comprising means connected to said flow meter for detecting liquid leakage during periods of no flow.

8. The apparatus of claim 7, wherein said leak detection means comprises voltage comparison means connected to said flow meter during periods of no flow and electronic switching means responsive to an output of said voltage comparison means indicating flow.

9. The apparatus as defined in claim 1 further comprising means responsive to movement of said adjustable fluid metering valve to fully open or fully closed position for disabling the control apparatus and halting liquid feed.

10. The apparatus of claim 9, wherein said means for disabling said control apparatus comprises a movable arm mounted for movement with an operating shaft of said adjustable flow metering valve, switches mounted on said adjustable flow metering valve in the path of travel of said movable arm at the extremities of the travel of said arm, and a relay operated by said switches for disconnecting said furnace level sensing means from said control apparatus.

11. In the method of feeding a liquid component to a dry ingredient component of a glass batch being added to a glass melting furnace, wherein a glass level sensing device is positioned in the furnace to signal a demand for adding batch; the steps of: flowing the liquid from a supply thereof, periodically disconnecting the flow of liquid in response to a signal from the level sensor monitoring the rate of flow of liquid, controlling the flow rate in response to the deviation of the monitored rate of flow from a preset rate of flow and maintaining the flow rate control at the level just prior to discontinuance of flow, during the period of flow discontinuance to avoid surging upon resumption of liquid feeding.

12. The method of claim 11 further including the step of detecting the occurrence of leakage in the liquid flow during the periods of discontinuance of flow.

13. The method of claim 11 further including the step of disabling the flowing control system in the event of extremes in the operation of the flow controlling during periods of flow resumption.

References Cited

UNITED STATES PATENTS

| | | | |
|---|---|---|---|
| 2,626,787 | 1/1953 | Harper | 137—101.19 |
| 3,012,373 | 12/1961 | Willis | 65—161 X |
| 3,525,090 | 8/1970 | Raddatz | 340—244 |
| 3,573,015 | 3/1971 | Canfield et al. | 65—161 |

ARTHUR D. KELLOGG, Primary Examiner

U.S. Cl. X.R.

65—160, 161; 137—101.19, 101.21